J. HOLLINGSWORTH.
Fertilizer Distributors.

No. 152,637                                    Patented June 30, 1874.

Witnesses.
James Martin Jr.
J. N. Campbell

Inventor.
James Hollingsworth

UNITED STATES PATENT OFFICE

JAMES HOLLINGSWORTH, OF CHICAGO, ILLINOIS.

IMPROVEMENT IN FERTILIZER-DISTRIBUTERS.

Specification forming part of Letters Patent No. 152,637, dated June 30, 1874; application filed February 14, 1874.

*To all whom it may concern:*

Be it known that I, JAMES HOLLINGSWORTH, of Chicago, in the county of Cook and State of Illinois, have invented an Improvement in Plaster and Fertilizer Distributers; and I do hereby declare that the following is a full, clear, and exact description thereof, reference being had to the accompanying drawings making part of this specification, in which—

Figure 1:
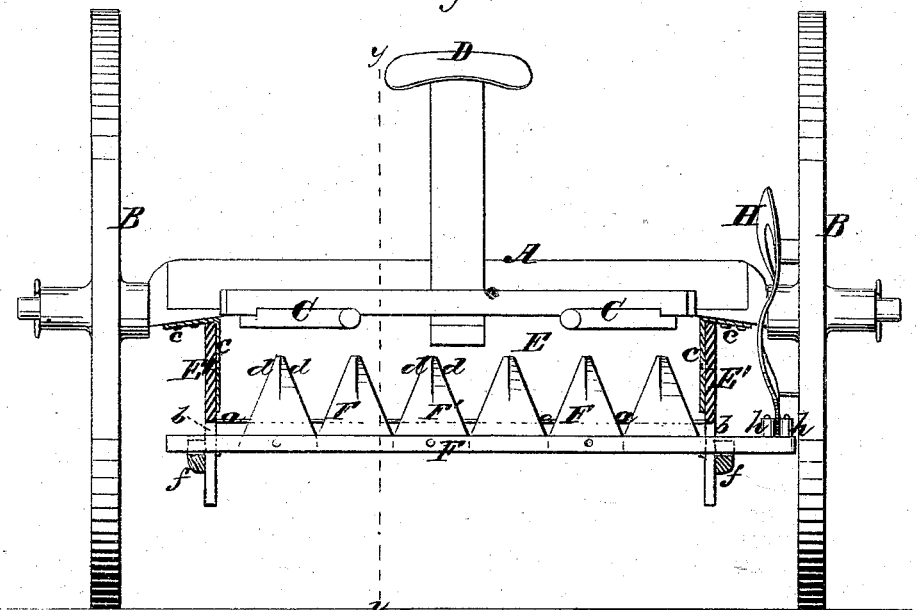
Figures 2, 3:
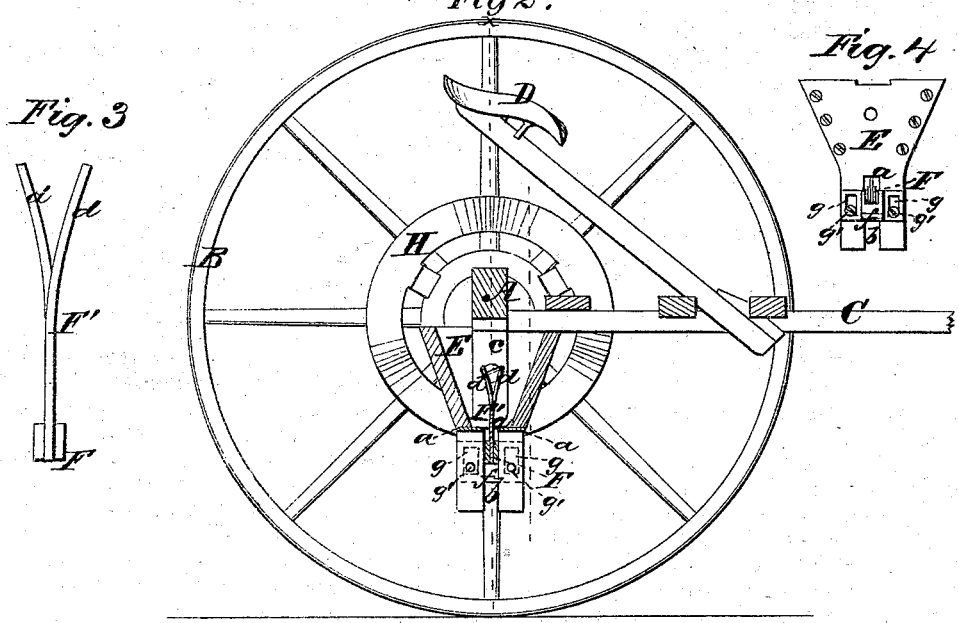
Figure 4:
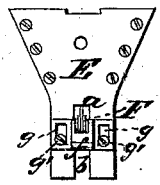

Figure 1 is a cross-section of the machine in the line $x\ x$ of Fig. 2. Fig. 2 is a vertical longitudinal section of the same in the line $y\ y$ of Fig. 1. Fig. 3 is an end view of the agitator, and Fig. 4 same view of the hopper and adjustable support of the agitator.

The nature of my invention consists, first, in an externally-supported agitating-bar, having sickle-teeth blades extending upward from it through the bottom and into the hopper of a plaster or fertilizer distributer, said bar resting on adjustable step-blocks or saddles, as will be hereinafter described. Second, it consists in adjustable supporting-steps on outside of hopper, in combination with the agitator described; third, in making the sickle-blades with a transverse split in them, extending down from their upper end some distance, the split portion being bent backward and forward, respectively.

The object of the first part of my invention is to overcome the very serious objections heretofore experienced with machines for sowing plaster and other finely-pulverized fertilizing substances. One very great objection is the difficulty with which the agitator-teeth, with their bar and other connections within the hopper, are moved through fine and closely-adhering fertilizing material, such as plaster.

The object of the second part of my invention is to provide for adjusting the outside supported agitator so that any desired quantity may be sown at the will of the operator.

The object of the third part of my invention is to effect a dividing and loosening up of the material in the back and forward movements of the agitator, and at the same time have but the smallest or narrowest possible device pass through the material to be sown.

To enable others skilled in the art to make and use my invention, I will now describe the same with reference to the drawings.

A represents an axle; B B, traction-wheels of any suitable construction. The axle may have thills C C or a tongue attached to it, and a seat, D, may be provided upon the carriage for the driver, in any proper location and manner. E is the plaster or fertilizer hopper. It, as usual, is constructed with a narrow slit, $a$, in the center of its bottom, extending from end to end. The end pieces E' E' of this hopper are extended down below its bottom, and the extensions are slotted, as at $b$, from the hopper-bottom down to and through their lower edge. This forms an open slot in each extension. The hopper thus constructed is hung on the under side of the axle A by means of angular metallic brackets $c\ c$, which are bolted to the inner sides of the end pieces of the hopper, and to the axle, as shown. F is a thin agitator-bar, with angular sickle or saw tooth blades F' attached to it. In this instance the bar is formed of two narrow strips, and the blades are set between these strips, and all bolted firmly together. The points of the blades are set upward, and these points are split transversely, and the separated parts of the blades are bent, one backward and the other forward, as shown in Fig. 3 at $d\ d$. The bar with the blades attached is passed upward through the open slots $b$ of the ends of the hopper, and by this means the pointed ends of the blades are passed up through the slot in the bottom of the hopper into the hopper, as shown in Figs. 1 and 2. In this position the bar and blades are confined by means of adjustable grooved step-blocks or saddles $f\ f$ outside of the end plates of the hopper, as shown. These blocks are slotted, as at $g\ g$, and the fastening-screws $g'\ g'$ pass through the slots. By this means of constructing, arranging, and supporting the agitator, its bar is kept entirely outside of the hopper, and the size of the V-shaped discharge-passages can be regulated from the minimum to the maximum, as occasion may require.

In order to move the agitator back and forth by the power of the team, the bar is extended at one end beyond the hopper, and on this extended end two upright pins, with friction-rollers $h$ $h$ on them, are applied; and upon the inner side of one of the traction-wheels $b$ a circular plate, H, with a serpentine conformation, as shown, is applied, so that its edge passes between the friction-rollers, and when in motion causes the agitator to reciprocate through the hopper.

I am aware that a bar of inverted-V form, and with separated teeth arranged to cross one another, has been arranged in a corresponding slot, which is in the bottom of the hopper, and supported by screws, an instance of this being seen in the Patent No. 35,920; therefore, I do not claim a bar thus provided with pins, nor the adjusting-screws upon which such a bar rests. My invention differs from this plan in this: the V-shaped agitator-teeth enable me to gage the amount of discharge from the minimum to the maximum without regard to the width of space between the bar and the sides of the slot in the hopper. My plan further differs in having the bar supported upon saddles at each end of the hopper, which are adjustable.

What I claim, and desire to secure by Letters Patent, is—

1. The agitator-blades F′, of sickle or angular form, applied point upward in a slotted hopper, E, and upon a reciprocating bar, F, supported below and outside of the hopper upon adjustable step-blocks, substantially as and for the purpose set forth.

2. The adjustable outside step-blocks $f$ $f$ of the hopper, in combination with the described agitator, substantially as set forth.

3. The sickle-blade agitator described, with the upper pointed ends of the blades split, and the separated parts of each blade deflected, one to the right and the other to the left, as and for the purpose described.

JAMES HOLLINGSWORTH.

Witnesses:
DAVID FALES,
NOBLE B. PUDAH.